_United States Patent_ [19]

Kolpek et al.

[11] 4,136,395
[45] Jan. 23, 1979

[54] SYSTEM FOR AUTOMATICALLY PROOFREADING A DOCUMENT

[75] Inventors: Robert A. Kolpek, Lexington, Ky.; David L. MacDuffee, Ramsey, N.J.; Walter S. Rosenbaum, Bethesda, Md.

[73] Assignee: International Business Machines Corporation, Armonk, N.Y.

[21] Appl. No.: 755,094

[22] Filed: Dec. 28, 1976

[51] Int. Cl.² .............................................. G06K 9/00
[52] U.S. Cl. .......................... 364/518; 340/146.3 WD; 400/63; 400/74
[58] Field of Search ............ 235/153 R; 340/146.1 R, 340/146.2, 146.3 AG, 146.3 ED, 146.3 WD; 197/19; 864/518

[56] References Cited
U.S. PATENT DOCUMENTS

| | | | |
|---|---|---|---|
| 3,259,883 | 7/1966 | Rabinow et al. | 340/146.3 ED |
| 3,850,279 | 11/1974 | Kolpek | 197/19 |
| 3,969,698 | 7/1976 | Bollinger et al. | 340/146.3 WD |
| 4,010,445 | 3/1977 | Hoshino | 340/146.3 WD |

Primary Examiner—Jerry Smith
Attorney, Agent, or Firm—John W. Henderson, Jr.

[57] ABSTRACT

Spelling errors in a word processing system are detected and presented to the operator for correction at the end of a document page. A dictionary memory contains representations of the correct spellings for words most frequently used. As each word is typed, it is stored in a word queue where it is compared to the contents of the dictionary memory. If the compare is unequal, then the word and its location on the page are stored in an error memory. When an end of page indicator is set the printer automatically repositions the print head at the ending character of the first word in the error list. When the operator keys in the correct spelling, the printer is caused to remove the misspelled word from the page and type the correct spelling. The corresponding word in the error memory is also corrected. As each misspelled word in the error memory is corrected, the remainder of the memory is scanned and repetitions of the same spelling error are automatically corrected.

13 Claims, 8 Drawing Figures

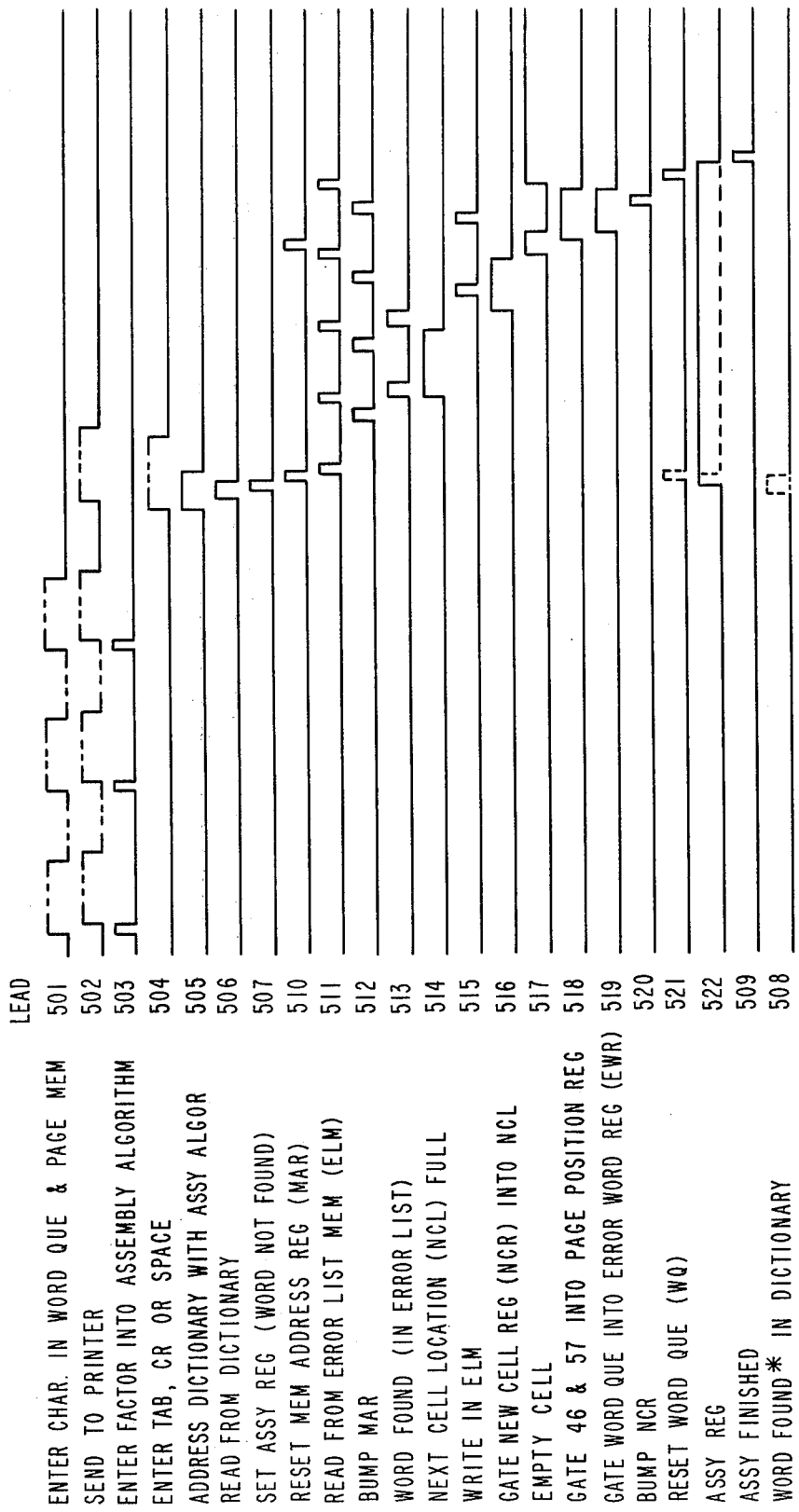
FIG. 5 SYSTEM TIMING CHART

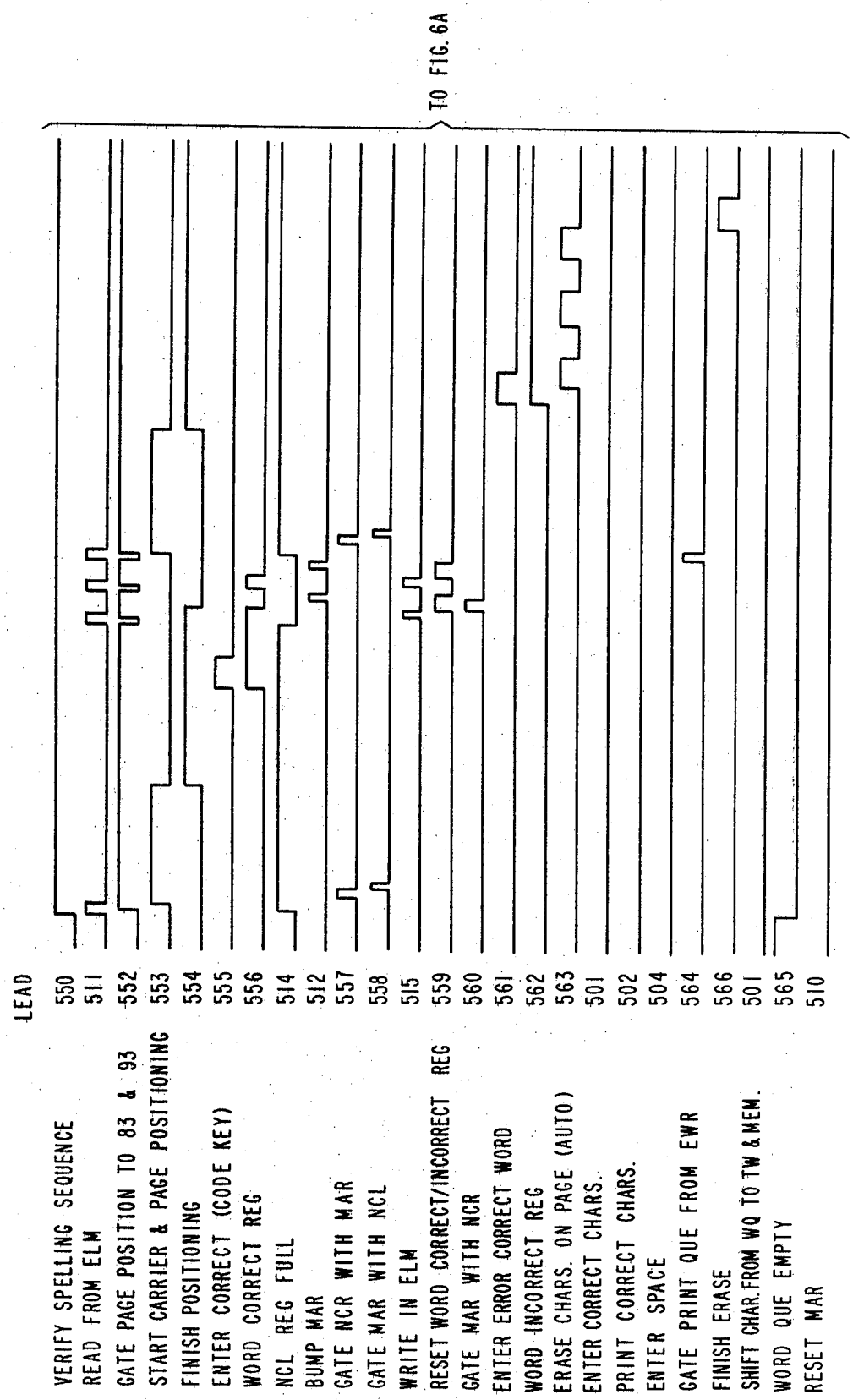
FIG. 6  SYSTEM TIMING CHART

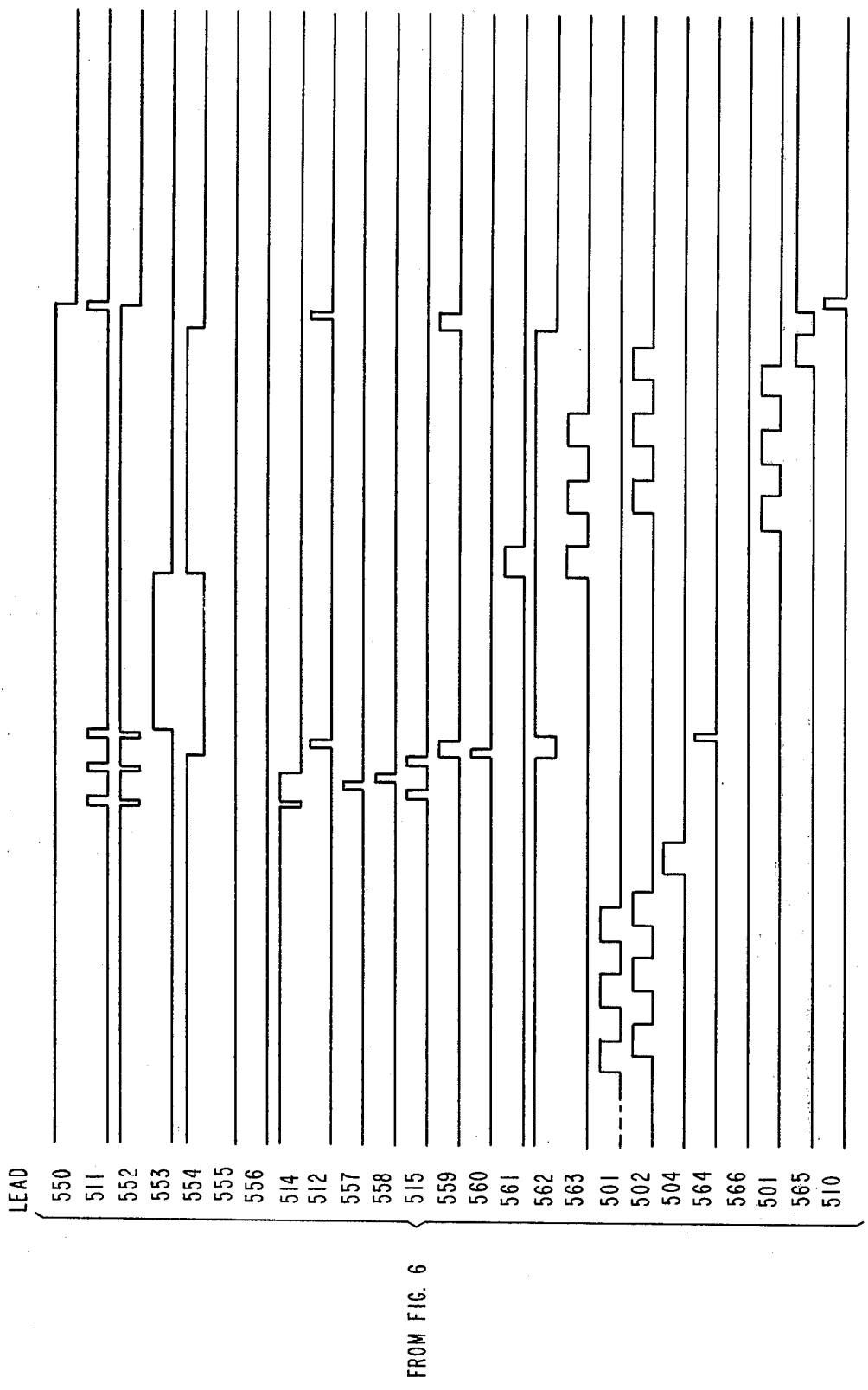
FIG. 6A    SYSTEM TIMING CHART CONTINUED

SYSTEM FOR AUTOMATICALLY PROOFREADING A DOCUMENT

BACKGROUND OF THE INVENTION

1. Field of the Invention

The invention disclosed herein related to data processing devices and more particularly relates to post processing devices for the detection of typographical errors resulting from the use of keyboards and the like.

2. Description of the Prior Art

One of the more burdensome problems to principals in the word processing industry is the necessity for retyping of documents due to spelling typographical errors. The invention of typewriters with electronic and/or magnetic memories has aided in the solution to this problem by permitting the typist to only retype the error words while the remainder of the text is played out automatically at high speed. However, the likelihood of spelling error free output from these devices is only as good as the spelling ability of the typist and the likelihood that error words will be overlooked is high.

A significant advance in the art of misspelling detection has been contributed by W. S. Rosenbaum in U.S. Pat. No. 3,995,254, issued Nov. 30, 1976, entitled "Digital Reference Matrix to Word Verification", and assigned to the same assignee as the present application. A digital reference matrix is disclosed therein which provides for compact storage of a dictionary of correctly spelled words to be used to verify input words from a keyboard, character recognition machine or voice analyzer. A vector representation for each word in the dictionary is calculated in the form of a magnitude and unique angle combination. These representations are stored in a memory. Input words to be checked for spelling errors then undergo a magnitude and angle calculation, the results of which are compared to the dictionary/memory. An output signal is generated indicating the result of the compare. While Rosenbaum provides an accurate means for verifying the spelling of input words, it does not provide for efficient operation in word processing systems where throughput is the paramount requirement. This lack of efficiency is due to the disruption of the operator's typing rhythm caused by signalling each time a typed word does not appear in the dictionary.

SUMMARY OF THE INVENTION

The invention provides a dictionary and an error list memory in a word processing system which includes processing logic, a keyboard, a printer and a page of storage. The error list memory has associated with it, pointers to load and unload the memory, a counter to describe which word in the list is being corrected, a location list which contains in sequence the absolute horizontal and vertical position in text of the end of each word on the page found in the error list, and a pointer to indicate the point being accessed in this location list.

Each word keyed on the keyboard is compared to the contents of the dictionary. Any word that is not found in the dictionary is stored in the error word memory along with its horizontal and vertical position on the page. Prior to storing a word in the error memory, the memory is searched to determine if the same error has previously occurred. If it has, a pointer is set at the previous occurrence indicating the address of the next occurrence of the error.

After a page is completed the error list memory is addressed for error words. The carrier automatically repositions itself at the first occurrence of the first error word in the error list memory. If the word is spelled correctly, the operator depresses a word correct key and a correct bit is set in each subsequent occurrence of the word in the error list memory. The system uses the correct bit to ignore the word when it is again encountered.

If the word is incorrectly spelled, the operator depresses a word incorrect key which causes automatic erasure of the word from the page. The correct word is then keyed in by the operator and the system automatically corrects all subsequent occurrences of the word in the memory and sets a word incorrect bit. A word subsequently encountered with its incorrect bit set is automatically erased from the page and correctly typed without operator intervention.

BRIEF DESCRIPTION OF THE DRAWING

FIG. 5 is a system timing chart for controlling system operation during keying of text on the keyboard.

FIG. 6 is a system timing chart showing the operation of the system at the end of a page of text.

FIG. 6A is a continuation of the system timing chart of FIG. 6.

DETAILED DESCRIPTION

Figure 1:
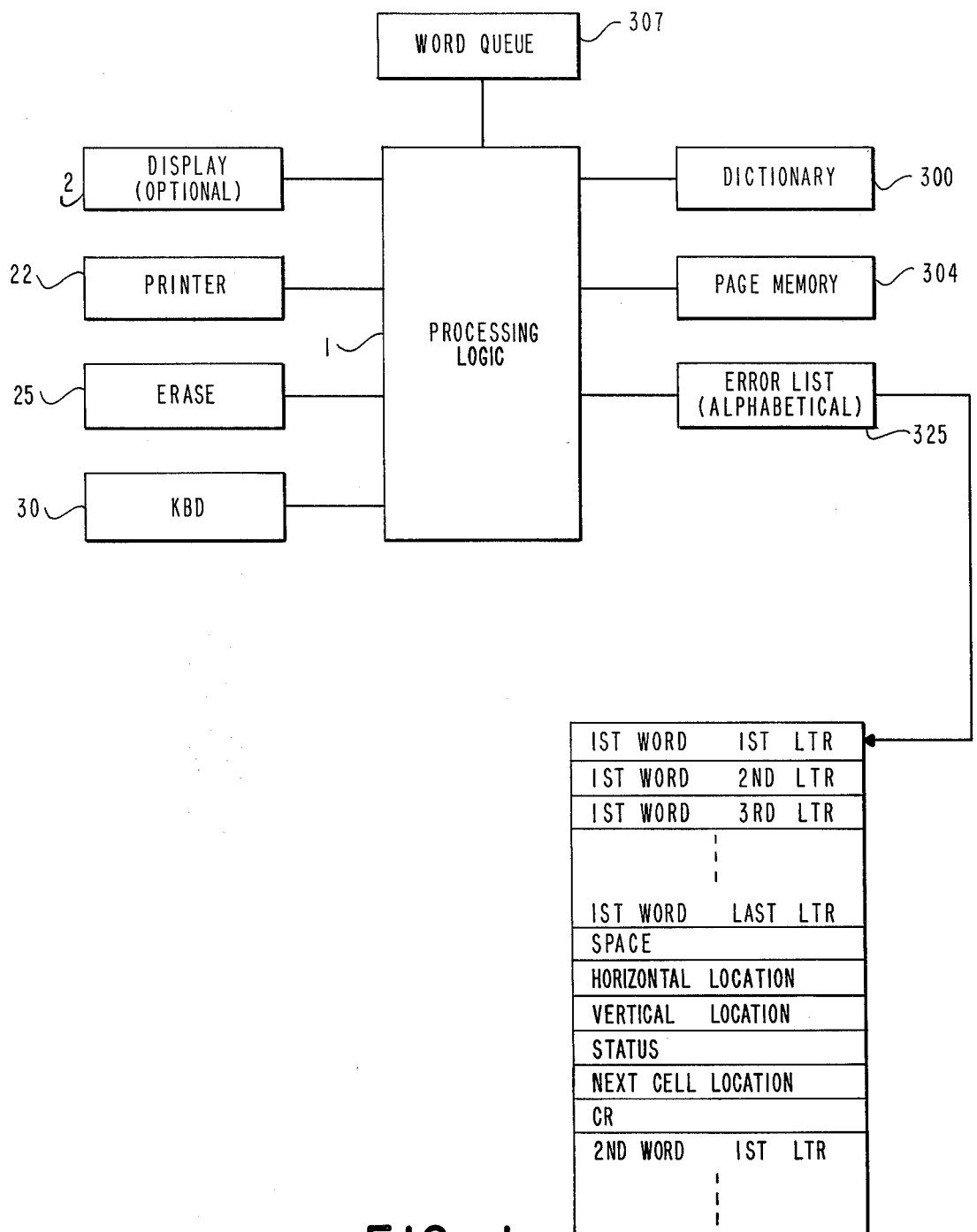
FIG. 1 is a block diagram of a word processing system including the apparatus of the present invention.
Figure 1A:
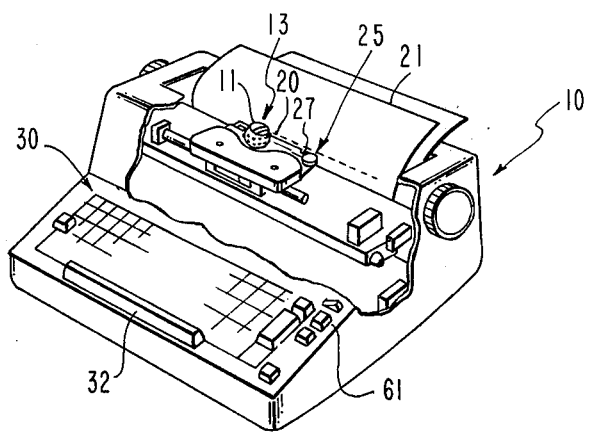
FIG. 1A is a perspective view of a typewriter including a keyboard and printer.

Referring now to FIG. 1, there is shown in block diagram form a word processing system. The system includes processing logic 1, display 2, auto erase 25, printer 22, keyboard 30, word queue 307, dictionary 300, page memory 304, and error memory 325. The printer may be a serial character-by-character impact page printer or typewriter 10 (FIG. 1A) that can be generally like the well known IBM SELECTRIC I/O Writer as described in IBM Customer Engineering SELECTRIC I/O Writer Instruction Manual, form/part number 241-5159-1, revised Nov. 12, 1962, published by International Business Machines Corporation, Armonk, New York. The typewriter 10 includes the well known printing mechanism 11 comprising a type element having characters shaped type thereon. The type element together with a page supporting impact resistant platen 13 defines a print point 20. The typewriter 10 also includes a keyboard 30 having printing control keys and print position moving keys such as a space bar 32, line return key, backspace, and line feed key.

Figure 2:
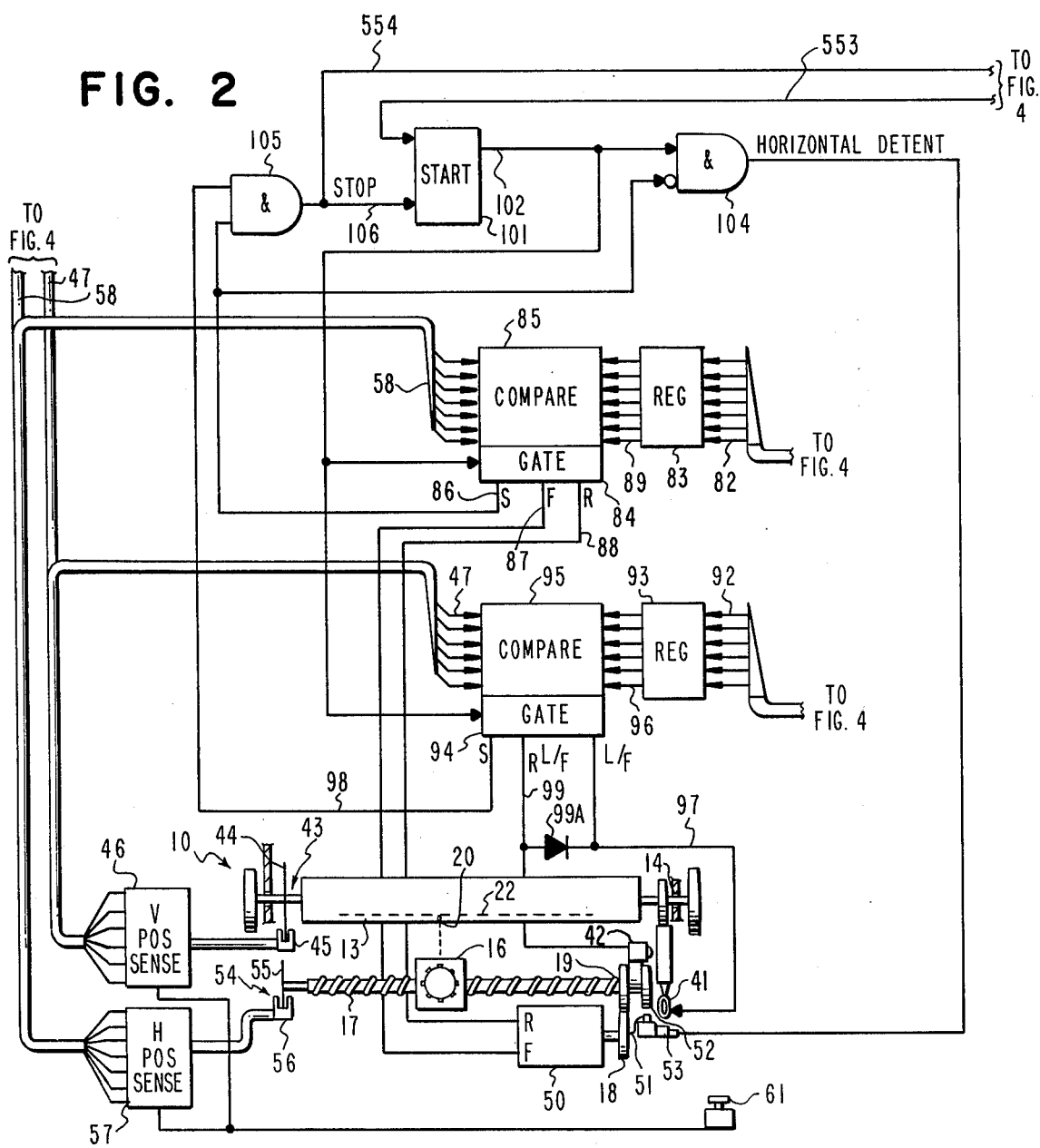
FIG. 2 is a diagramatic illustration of the typewriter shown in FIG. 1 together with the control circuitry by which the typewriter is controlled.

Referring now to FIG. 2, the typewriter 10 is provided with horizontal and vertical motion transducers 54 and 43 respectively, each of which can be similar in theory and operation to that disclosed in U.S. Pat. No. 3,579,195. The horizontal motion transducer 54 comprises a pulse emitting wheel 55 which generates strobed position and direction information in photosensing mechanism 56 by which displacement of the lead screw 17 in individual character increments is measured. Suitable control circuitry including a counting register provides a digital horizontal print point position sensing device 57. The sensing device 57 stores a seven digit true binary code output that numerically represents the column position of print point 20 along the writing line 22.

The vertical motion transducer 43 is substantially identical to transducer 54 and includes an emitter wheel 44 and optical sense mechanism 45. Suitable control circuitry including a counting register provides a digital vertical print position sensing device 46. Sensing device 46 stores only a six digit binary code output which is numerically representative of the writing line position of the page 21 within the typewriter 10.

The lead screw 17 is driven through gears 18 and 19 by a direct current, forward and reverse drive motor 50. The carrier 16 thus is positioned along the length of platen 13 by operation of the motor 50. To obtain precise positioning of the print point 20, a detent member 51 is normally engaged with a ratchet wheel 52 on the lead screw 17. When seeking a new typing field, electro-magnet 53 is activated to withdraw the detent member 51 from ratchet wheel 52 and thereby free the lead screw 17 for movement prior to driving of lead screw 17 by motor 50. Termination of lead screw rotation is followed by release of electro-magnet 53 and re-entry of the detent member 51 to again precisely position and hold the lead screw 17.

In summary it is seen that the typewriter 10 provides a mechanism capable of positioning the print point 20 horizontally and vertically both in the forward and reverse directions. While a type impact printer has been illustrated, those of skill in the art will recognize that a serial printer operating to produce visibly hard copy by other techniques would be equally appropriate. For example, the printing mechanism could employ a controlled ink jet spray, a thermal matrix, or an optical character generator with equal facility. Also, the printer could be replaced by other suitable types of output devices such as video displays or audio output device.

In operation, a page 21 is inserted by the operator to align a fixed position on the page 21 with the print point 20. Reset key 61 is depressed to set the horizontal position sensing device 57 and vertical position sensing device 46 to a zero or normalized position. Thereafter, all displacement of the print point 20 relative to the page 21 is accounted for and the horizontal and vertical print point position sensing devices 57 and 46 as unit displacement is added or subtracted with the motion of either the platen or carrier 16.

Figure 3:
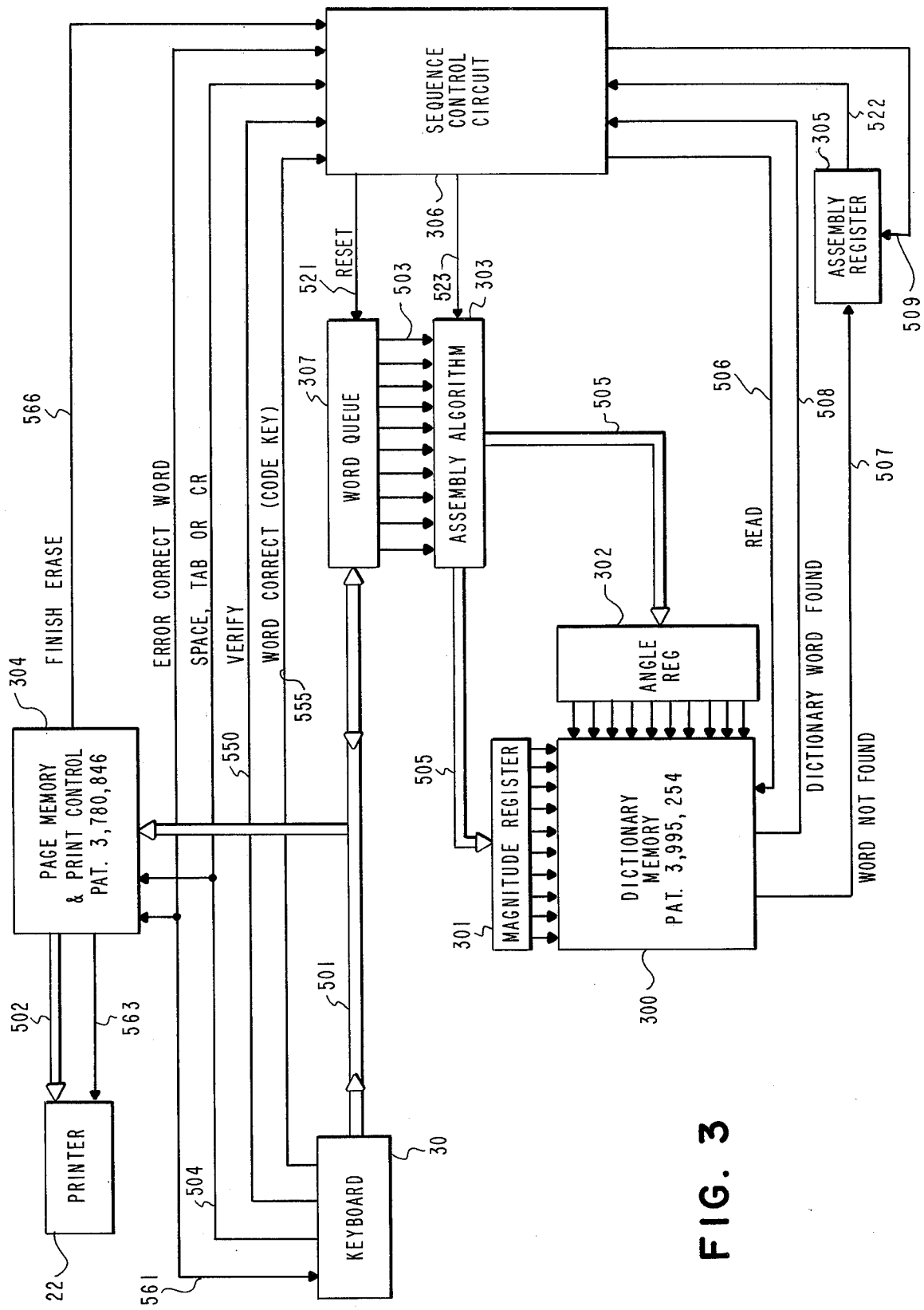
FIG. 3 is a diagramatic illustration of the circuitry for the dictionary verification function.

Referring now to FIG. 3, keyboard 30 is connected by data bus 501 to word queue 307 and page memory and print control 304. The page memory and print control apparatus is fully disclosed in U.S. Pat. No. 3,780,846, issued Dec. 25, 1973, to R. A. Kolpek, et al., assigned to the same assignee as the present invention and expressly incorporated herein by reference. Characters keyed on the keyboard are stored in the page memory and the print control controls the print mechanism in printer 22 along bus 502 to print each character on the print media 21.

Word queue 307 stores each character as it is keyed on keyboard 30. The output of word queue 307 is connected to assembly algorithm 303 through data lines 503. Assembly algorithm 303 calculates a vector representation for the group of characters stored in word queue 307 in accordance with the theory and apparatus disclosed in U.S. Pat. No. 3,995,254, entitled "Digital Reference Matrix for Word Verification", issued Nov. 30, 1976, to W. S. Rosenbaum, assigned to the same assignee as the present invention, and expressly incorporated herein by reference. The assembly algorithm 303 is connected to sequence control circuit 306 through line 523 and is activated to calculate the vector representation for a word stored in word queue 307 when a space, tab, or carrier return is keyed on keyboard 30 and sensed by sequence control circuit 306 over line 504. The sequence control 306 and the gates and registers on FIGS. 3 and 4 make up the processing logic on FIG. 1. The sequence control 306 provides the sequential timing signals shown in FIGS. 5, 6, and 6A for initiating the operations in the components of the processing logic 1 of FIGS. 3 and 4. The detailed discussion of the timing signals appears in the operation section of the specification. Circuits that may be used as a sequence control for a sequentially operating system are well known in the prior art. For example, a read only memory may be used where each of the signals input to the read only memory accesses a specified address within the memory which outputs one signal or a series of signals in response to the input. Basic sequence control circuits exist in text books. As an example, the text book entitled "Arithmetic Operations In Digital Computers" by R. K. Richards, copyright 1955, published by D. Van Nostrand Company, Inc. at pages 337-342 features two exemplary circuits. The first of these circuits is a clocked or "synchronous" control circuit and the second one is an unclocked or "asynchronous" control circuit.

Richards' asynchronous control circuit comprises an operation matrix having an output line for each of the operations the system will perform and having miscellaneous input lines from other devices in the system. The operation matrix and the miscellaneous input lines communicate with a series of AND gates and delays. Inputs to the AND gates pass through the delays to provide output command signals which are used to run the system in the manner shown in FIGS. 5, 6 and 6A of this application. In an asynchronous control system, as in the sequence control circuit of this invention, "there is no fixed time reference for the execution of the operations. Instead, one operation is commenced as soon as the previous one is completed. To accomplish this purpose, the circuits must be arranged so that, at the completion of each operation, a signal is generated which may be used to initiate the next one". The output of assembly algorithm 303 is connected to magnitude register 301 and angle register 302 over lines 505. Dictionary memory 300 contains vector representations for a predefined dictionary of words. When a word end signal is sensed by the sequence control circuit 306, it outputs a read signal to dictionary memory 300 over line 506. The address for the read is defined by the magnitude and angle calculated for the word in word queue 307 by assembly algorithm 303. If the word is correctly spelled, the output of the dictionary memory 300 will be on output line 508 to sequence control circuit 306 so indicating. The sequence control circuit 306 then resets word queue 307 over line 521 and the dictionary is ready to verify the next word.

A second output from dictionary memory 300 is connected to assembly register 305 over line 507. If the word in word queue 307 is not found in dictionary 300, then a signal so indicating is output on line 507 to set assembly register 305. The output of assembly register 305 is connected to sequence control circuit 306 over line 522.

Figure 4:
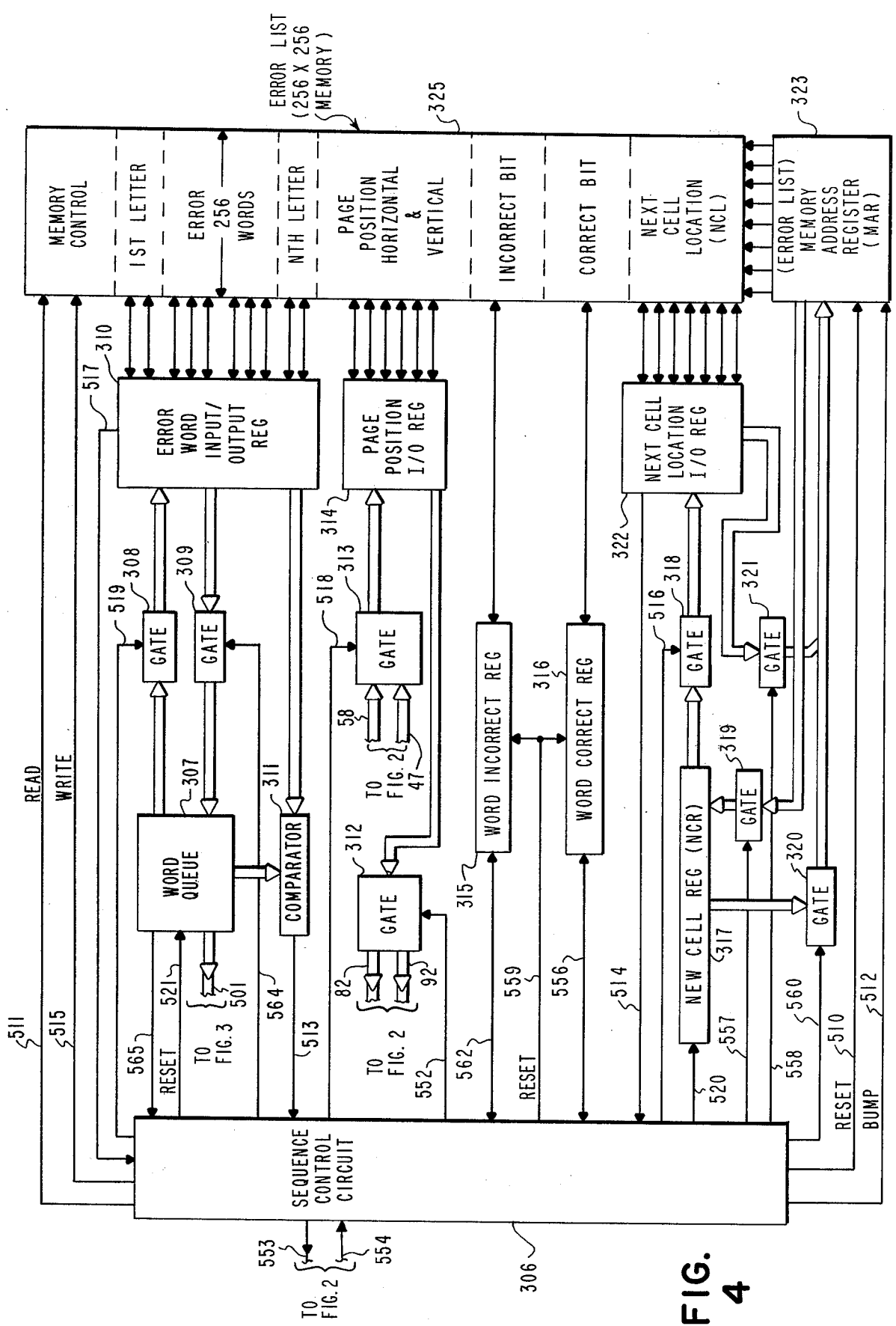
FIG. 4 is a diagramatic illustration of the error word memory and its associated control circuitry.

Referring now to FIG. 4, sequence control circuit 306 has an output to error list memory address register 323 over line 510. An input to the sequence control circuit 306 over line 522 from assembly register 305 causes the sequence control circuit to reset memory address register 323 to the first location in memory 325 over line 510. A read signal output from sequence control circuit 306 is connected to error memory control over line 511. A signal on line 511 causes memory control to read from the memory, at the address specified by memory address register 323, the error word into error word input/output register 310, the page position into page position I/O register 314 and the next cell location into the next cell location I/O register 322. Error word input/output register 310 serves three functions. When an error word occurs during input keying, each word already stored in error list memory 325 is read out into error word input/output register 310 for comparison by comparator 311 to the word stored in word queue 307. The purpose of this comparison is to determine if the error word stored in word queue 307 has previously been stored in the error list memory 325. The second function of the error word input/output register 310 is to receive a word from word queue 307 through gate 308 that is to be written into the error list memory 325. The third function of the error word input/output register 310 is utilized during the error correct operation wherein each word in the error list memory 325 is gated from the error word input/output register into the word queue 307 through gate 309 for transfer over line 501 to the page memory and print control 304 for correction.

The page position I/O register 314 has an input connected to gate 313 which is connected to the vertical position sense register 46 and the horizontal position sense register 57 over lines 47 and 58 respectively. The page position input/output register temporarily stores the vertical and horizontal locations of a word on the print media 21. During the input keying phase of operation, the page position I/O register 314 stores the location of an error word which is to be written into error list memory 325. During the error correct phase of operation, page position I/O register 314 passes the location of a word to be corrected through gate 312 over lines 82 and 92 to registers 83 and 93 to cause the carrier to space to the defined print position on the media 21.

The next cell location register 322 controls the contents of the next cell in error list memory 325 which is associated with each error word stored in the error list memory. The next cell defines whether or not an error word appears more than one time in the error list memory 325. If the word appears more than one time then the next cell location associated with that word will contain the address of the next occurrence of the word in the error list memory 325. During the input phase of operation, the next cell location is read out with each error word during the comparison to the contents of the word queue 307. If a word already stored in the error list memory 325 is equal to the word in the word queue 307 and the next cell location associated with that the word is empty, then the address at which the word in word queue 307 will be stored is written into the next cell location of the word already stored in error list memory 325. During playout, the next cell location is used to automatically correct the error in all subsequent locations in the error list memory once the word is corrected at its first occurrence.

The new cell register 317 always contains the address of the next empty cell in the error list memory. During the input phase when a word is to be written into the error list memory the contents of the new cell register are gated through gate 318 into the next cell location register 322 so that an empty cell location is recorded with the word. The word correct register 316 is connected to sequence control circuit 306 over line 556 into error list memory 325. During the error correct phase of operation when a word appears in the error list memory because it was not found in the dictionary memory 300, but which is actually spelled correctly, the operator will activate a key on keyboard 30 to set the word correct register 316. The word correct register 316 then causes a correct bit to be set in each occurrence of the word in error list memory 325. Thereafter, when the word is encountered in the error list memory 325 and has its correct bit set, it is simply ignored. The word incorrect register 315 is connected to sequence control circuit 306 through line 562 and to error list memory 325. During the error correct phase when a word appears in the word queue that is incorrectly spelled then the operator will activate an incorrect key on the keyboard 30. The incorrect key sets word incorrect register 315 and activates an incorrect bit at each occurrence of the word in error list memory 325. Each additional occurrence of the word is also automatically corrected at this time. Thereafter, during playout whenever the word appears it is automatically erased from the print media 21 and the corrected version inserted in its place.

While in the preferred embodiment of the invention the input device is a keyboard, it is well understood that it is within the skill of the art to substitute other input devices without changing the spirit or scope of this invention.

OPERATION

FIG. 5 shows a timing chart representing the input phase of operation of the system. Referring to FIGS. 3 and 4 in conjunction with FIG. 5, input characters keyed on the keyboard 30 are passed to word queue 307 and page memory and print control 304 over data bus 501. The print control section of block 304 passes the characters onto printer 22 over data bus 502. As each character enters the word queue 307 it is passed over line 503 into the assembly algorithm 303. At the end of a word, a space, tab, or carrier return pulse passes from keyboard 30 over line 504 to the sequence control circuit 306. Receipt of a space, tab or carrier return causes the sequence control circuit 306 to send a signal on line 506 to read from the dictionary memory the word defined by the contents of the magnitude and angle registers 301 and 302 generated by the assembly algorithm 303. If the word is not found, which would indicate that it is incorrectly spelled, then the assembly register 305 is set over line 507. This brings up a signal on line 522 from the output of assembly register 305 to the input of sequence control circuit 306. The input signal to sequence control circuit 306 on line 522 causes the sequence control circuit 306 to output a pulse on line 510 to reset memory address register 323 to the first memory location in error list memory 325. Sequence control circuit 306 then causes a read signal on line 511 to read the first word in the error list memory 325 into the error word input/output register 310 along with its corresponding page position into the page position I/O register 314 and its next cell location into next cell location register 322. The word just read from the error list memory 325 into error word input/output register 310 is compared to the present incorrect word stored in word queue 307 by comparator 311. The memory address register 323 is then incremented to the next memory location over line 512. This comparison sequence is repeated for each word already stored in the error list memory 325.

If the word in word queue 307 compares equal to any word already stored in error list memory 325, an output signal will be generated from the comparator 311 to the sequence control circuit 306 on line 513. In FIG. 5 an equal comparison appears after the second read pulse on line 511 which brings up the pulse on line 513 indicating that the word is found in the error list. When a word is found to already appear in the error list memory 325, the contents of the next cell location register 322 corresponding to that word is tested on line 514 by the sequence control circuit 306. If the contents of the next cell location indicates that it is full this means that the word appears subsequently in the error list memory also. Reading from the error list memory into the error word register 310, page position register 314 and next cell location register 322 continues until the word is subsequently found and its next cell location is empty as shown by no pulse on line 514. At this time, the sequence control circuit 306 outputs a gate signal on line 516 to gate 318 the contents of the new cell register 317 into the next cell location I/O register 322. This places the address of the next empty cell in the next cell location I/O register 322. A write signal is then produced by sequence control circuit 306 on line 515 to the memory control section of the error list memory 325. This write signal causes the contents of the error word input/output register 310, the page position I/O register 314, and the new contents of next cell location I/O register 322 to be rewritten into the error list memory 325.

The next read signal on 511 from sequence control circuit 306 to the error list memory 325 will produce an empty cell signal on line 517 from error word input/output register to sequence control circuit 306. At this point the memory address register 323 is reset by a signal on line 510 and the contents of vertical position register 46 and horizontal position register 57 are gated by a signal on line 518 through gate 313 into the page position I/O register 314. Also, the contents of the word queue 307 are gated through gate 308 by a signal on line 519 into the error word input/output register 310. The sequence control circuit 306 then outputs a write signal on line 515 to the memory control section of the error list memory 325 to write the contents of the error word input/output register 310, page position I/O register 314, and next cell location I/O register 322 into the error list memory 325. The new cell register 317 is then bumped over line 520 to the address of the next empty cell in the error list memory. Following this, a final read from the error list memory 325 indicates that the next cell location is empty and the word queue 307 is reset and an assembly finished signal is output by the sequence control circuit to the assembly register 305 on line 509. The preceding sequence is repeated for each word that is keyed on the keyboard and does not appear in dictionary until the operator enters a end of page signal on key 61.

Keying of an end of page signal on keyboard 30 initiates a verify signal on line 550 to the sequence control circuit 306. Since the memory address register 323 is reset upon the completion of each operation during the input sequence, it already contains the address of the first location in the error list memory 325. Sequence control circuit 306 initiates a read signal on line 511 to the memory control section of error list memory 325. This read causes the contents of the first cell in the error list memory 325 to be transferred into the error word input/output register 310, the page position I/O register 314, and the next cell location I/O register 322. The sequence control circuit 306 signals gate 312 on line 552 to gate the contents of the page position I/O register on data busses 82 and 92 into binary registers 83 and 93 of FIG. 2. As is well known in the art, these registers 83 and 93 are constructed to be overridden by whatever information is gated into them. The contents of registers 83 and 93 are compared by comparators 85 and 95 to the contents of horizontal position sense register 57 and vertical position sense register 46 which contain the present print position of the carrier mechanism on the print media 21. A start carrier and page positioning signal is initiated by the sequence control circuit on line 553. The signal on line 553 sets a start latch 101 to activate an output line 102. The start signal is then applied to the horizontal detent control AND circuit 104 and into enabling gates 84 and 94 respectively of horizontal compare circuit 85 and vertical compare circuit 95.

If horizontal repositioning is required, that is, if the comparison is unequal, indicating that the carrier is not at the location of the misspelled word on the print media, a "not horizontal stop" signal will be presented by line 86 to the inverted input to AND circuit 104 and the coincidence will be satisfied. Electromagnet 53 is thus activated to withdraw detent 51 from ratchet 52. Horizontal compare circuit 85 will provide one of three outputs respectively on a forward drive output line 87, a reverse drive output line 88 and the stop drive output line 86. Compare circuit 85 functions to determine whether the binary code presented by horizontal print point position sensing device 57 on lines 58 is greater, less than or equal to the binary code presented by register 83 on lines 89.

If the binary code on lines 89 is greater than that on lines 58, a signal will be presented to the forward drive output line 87 which is connected to the motor 50 so as to drive the motor 50 in a direction to move carrier 16 to the right by rotation of lead screw 17. The rotation of lead screw 17 is sensed by optical sensor 56 in terms of the number of pulses in a direction of lead screw rotation as described in U.S. Pat. No. 3,579,195. These pulses are added to the original binary number retained in the horizontal print point position sensing device 57 to continuously update the binary code presented by lines 58 to compare circuit 85. When the binary code presented on lines 58 equals the binary code presented on lines 89, the signal on forward drive line 87 will be removed and in its place a signal will be generated on stop line 86. This signal provides an input to stop AND circuit 105 and also applies a horizontal stop signal to horizontal detent AND circuit 104 thereby completing the required coincidence necessary to deactivate electromagnet 53 and permit detent pawl 51 to reengage lead screw detent ratchet 52 to securely retain the newly obtained horizontal position of carrier 16.

The same operation occurs if the binary code presented on lines 89 is of a lesser magnitude than that presented on lines 58 with the exception that the compare circuit output signal would appear on reverse feed line 88 to drive the motor 50 in a direction such that carrier 16 is displaced leftwardly by rotation of the lead screw 17. This displacement of the lead screw 17 decrements the horizontal print point position sensing device 57 to reduce the binary code applied to lines 58 until it becomes equal to that applied by lines 89. Vertical compare circuit 95 operates like horizontal compare circuit 85 and determines the difference between a desired vertical position as presented in the form of a binary code by register 93 on lines 96 with the current print position as presented in binary form on lines 47 from the vertical print point position sensing device 46. If the binary code presented on lines 96 is greater than that presented to the compare circuit 95 by lines 47, the line feed signal will be applied to output line 97 to energize line feed magnet 41 and cause repeated stepping of the platen to move the print point 20 toward the bottom of the page 21. Motion of the platen is sensed both in magnitude and direction by optical sensor 45 which increments the vertical print point position sensing device 46 to continuously update the binary code applied to line 47. When the code applied to line 47 equals that presented on line 96, the output signal on feed line 97 is removed and an output signal is applied to vertical feed stop line 98 which is connected to the stop AND circuit 105. A signal applied simultaneously by line 98 and line 86 to stop AND circuit 105 generates an output on line 106 to reset start latch 101 and terminate the operation. At this time the print element 11 is positioned at the last character in the word which is to be corrected and a signal on line 554 indicates completion of positioning to the sequence control circuit 306.

As soon as the word at the address specified by the memory address register 323 has been read from the error list memory into the error word input/output register 310, page position input/output register 314, and next cell location input/output register 322, the sequence control circuit 306 senses line 514 which is "high" indicating that the next cell location I/O register is full and correspondingly that the word under consideration appears more than once in the error list memory 325. Sequence control circuit 306 then activates gate 319 over line 557 to pass the address in memory address register into new cell register 317 thereby storing the address of the first occurrence of the word in error list memory 325. Sequence control circuit 306 activates gate 321 over line 558 to pass the address in the next cell location register 322, which indicates the address of the next occurrence of the word, into the memory address register 323.

After the print element has been positioned to the last character of the word, the operator observes the word to determine if the word is spelled correctly or incorrectly. In the example under consideration, the first word observed is spelled correctly and therefore the operator presses the word correct key on the keyboard 30 which causes a pulse on line 555 to the sequence control circuit 306. The sequence control circuit activates word correct register 316 over line 556. A second read from error list memory 325 is then executed by sequence control circuit 306 over line 511. This read reads the second occurrence of the error word from the error list memory into the error word input/output register 310, page position I/O register 314, and next cell location I/O register 322. Having the word correct register 316 set during a read operation inhibits the signal on line 552 from causing a repositioning of the carrier. Following this read, the signal on line 514 indicates that the next cell location register 322 is "low" and that this is the last occurrence of this word in the error list memory 325. Sequence control circuit 306 then initiates a write signal on line 515 to the memory control section of error list memory 325 causing the word stored in error word register 310, page I/O position register 314, and next cell location register 322 along with the word correct bit to be rewritten back into the error list memory 325. Having the word written in the error list memory 325 with the correct bit on will cause the word to be ignored when it is subsequently addressed. This step is repeated for each occurrence of the same word in the error list memory 325. Following the write into the error list memory 325, sequence control circuit 306 resets the word correct register 316 over line 559 causing line 556 to become "low". Gate 320 is then activated by the sequence control circuit over line 560 to gate the contents of the new cell register 317 into the memory address register 323. This places the initial location address back into the memory address register. The memory address register 323 is then bumped over line 512 by sequence control circuit 306 to the address of the next word in the error list memory 325. A read is then initiated by the sequence control circuit to the memory control section of the error list memory 325 over line 511. At the completion of the read cycle, the output of the word correct register on line 556 becomes "high" indicating that the word just read is one that was found to be correct during the previous cycle. Therefore, no positioning takes place and the sequence control circuit 306 initiates a write on line 515 to the memory control section of error list memory 325 to rewrite the word into the memory. A signal is then initiated on line 559 to reset the word correct register 316. The memory address register is then bumped over line 512 to the address of the next error word in error list memory 325 and a read is initiated on line 511 to read the word and its corresponding position information into the error word register 310, page position register 314, and next cell location register 322.

Following the read operation, gate 312 is activated by a signal on line 552 to gate the contents of the page position I/O register 314 into binary registers 83 and 93 to start repositioning the carrier to the position of the last character in the word on media 21 over line 553 as previously described. Line 514 becomes "high" indicating that the next cell location register 322 is full. The contents of the memory address register are then gated through gate 319 by a signal on line 557 into new cell register 317 and the contents of the next cell location register 322 are gated through gate 21 into the memory address register 323 by a signal on line 558. Sequence control circuit 306 also activates gate 309 over line 564 to pass the contents of the error word register 310 into word queue 307.

Following repositioning of the carrier to the last character in the word under consideration, the operator must again make a choice as to whether the word is spelled correctly or incorrectly. In the example under consideration, a signal is produced on line 561 from the keyboard to the sequence control circuit indicating that the word is spelled incorrectly. This causes the sequence control circuit 306 to set the word incorrect register 315 over line 562. The signal on line 561 also activates page memory and print control 304 to initiate over line 563 erasure of the characters on the page by the printer 22. The printer is equipped with an erase ribbon 27 and other additional erase apparatus as is fully disclosed in U.S. Pat. No. 3,780,846, which is expressly incorporated herein by reference. If the word to be entered has more or less characters than the error word on the page, the operator may control the apparatus of U.S. Pat. No. 3,780,846 to erase the entire line or any portion thereof as is necessary.

Upon completion of the erasure, a signal is produced on line 566 from page memory and print control 304 to sequence control circuit 306. The operator then enters the correct characters on keyboard 30 which are transferred on line 501 to page memory and print control 304 and into word queue 307. Page memory and print control 304 causes the characters to be printed upon printer 22 over line 502. Upon completion of keying of the corrected word, the operator enters a space by depressing the space bar 32 which signals the sequence control circuit 306 over line 504. The sequence control circuit 306 then initiates a read on line 511 to read the next word from the error list memory 325. Since the next cell location register 322 was full on the previous read cycle and that address was gated into the memory address register this read occurs at the address of the next occurrence of the same error word in the error list memory. Again, the next cell location address register 322 presents a "high" signal on line 514 indicating that the same word occurs at a succeeding location in the error list memory 325. Since the word in the error word input/output register 310 is the same as the word just corrected, the sequence control circuit 306 initiates a write signal on line 515 to write the contents of the word queue 307 into the error list memory 325. Since at this time the word incorrect register 315 is presenting a "high" signal on line 562 an incorrect bit is also written into the error list memory 325 with the word.

Following the write into the error list memory 325, sequence control circuit 306 activates gate 319 over line 557 to gate the contents of memory address register 323 into the new cell register 317. The memory address register 323 then has the contents of the next cell location register 322 gated into it through gate 321 by a signal on line 558 from sequence control circuit 306 so that now the memory address register contains the address of the next occurrence of the same word in the error list memory 325. The sequence control circuit 306 then initiates a read signal on line 511 from error list memory 325. Following this read the output of the next cell location register 322 on line 514 is low indicating that this is the last occurrence of this word in the error list memory 325. The correct word from the word queue 307 is once again written into the error list memory 325 in response to a write signal on line 515 from sequence control circuit 306.

Since the same word does not occur in the error list memory 325 again as indicated by the output on line 514 from the next cell location register 322, the sequence control circuit initiates a signal on line 559 to reset the word incorrect register 315. The sequence control circuit 306 also pulses line 560 to activate gate 320 and pass the address in the new cell register into the memory address register 323. This places into the memory address register 323 the address of the first occurrence in the error list memory 325 of the word just corrected. Since the first occurrence of that word was corrected when the operator keyed in the correct spelling of the word, the sequence control circuit 306 initiates a signal on line 512 to advance the memory address register to the next succeeding address. A signal on line 511 to the memory control section of the error list memory 325 is now output by the sequence control circuit 306 to read the word at the address now stored in the memory address register 323. A signal on line 564 activates gate 309 to gate the word from the error word input/output register 310 into the word queue 307. Concurrently the word incorrect register output 562 goes "high" indicating that the word just read has already been corrected in the error list memory 325, but has not been corrected on the page 21. Sequence control circuit 306 initiates a signal on line 553 to position the carrier at the position of the word just read on the page 21 as was previously described. When the carrier is positioned at the last character in the word, a signal is produced on line 561 to initiate entry of the corrected word. This signal causes the sequence control circuit 306 to generate, in sequence, a signal on line 563 to erase a character, a signal on line 501 to shift the corresponding character from the word queue 307 to the page memory and print control 304, and a signal on line 502 to print the corrected character on the printer 22. This sequence is repeated for each character in the word as can be seen in FIG. 6A.

After the last character in word queue 307 has been shifted out, a word queue empty signal is produced on line 565 to the sequence control circuit 306. Following the printing of the last character in the word, a signal is produced on line 559 by the sequence control circuit 306 to reset the word incorrect register 315. This causes the output of the word incorrect register 315 on line 562 to go "low". The memory address register is then advanced to the address of the next word in the error list memory 325 by a signal on line 512 from sequence control circuit 306. Sequence control circuit 306 then initiates a signal on line 511 to the memory control section of error list memory 325 to read the next word from the error list memory. If the previous word read was the last word in the error list memory 325, word queue 307 produces a signal on line 565 to the sequence control circuit 306 indicating that the word queue is empty. At this point, the memory address register 323 is reset on line 510 and the system is ready for keying of a new page of data on the keyboard.

What has been described in detail herein is a system wherein the basic input/output units are keyboard and a printer. However, it is well understood that it is within the skill of the art to include a display in the system on which the words contained in the error list memory could be presented to the operator for correction in the memory prior to any repositioning of the carrier to the error words on the page 21, or for that matter, the page need not be repositioned, but the corrections could be recorded back in memory for display or print out at a subsequent time. After the operator made the corrections in the memory, all error words on the page would be corrected automatically from the memory as opposed to the operator making the first correction on the page as was described above. Likewise, it is equally within the skill of the art to print out the contents of the error list at the end of a page where the erase feature is not available. In this approach, the corrections are made in the page memory and a clean sheet of paper used for final playout.

We claim:

1. Apparatus for detecting and correcting erroneous data signals in a number of data signals comprising:
   a source of data signals;
   means for comparing said data signals with a list of valid data signals;

means responsive to said comparing means for indicating erroneous data signals when said erroneous data signals do not compare to said valid data signals; and means for correcting said erroneous data signals operative such that the correction of one occurrence of said erroneous data signals will automatically correct all similar occurrences of erroneous data signals.

2. The apparatus of claim 1 wherein said source of data signals is a keyboard.

3. The apparatus of claim 1 wherein said list of valid data signals is a memory containing representations of the correct spellings of a plurality of words.

4. The apparatus of claim 1 wherein said means for indicating includes means for encoding a representation of the location of said erroneous data signals in said data signals.

5. The apparatus of claim 4 wherein said means for indicating is a printer having a print element operatively connected to an error memory in which said erroneous data signals are stored.

6. The apparatus of claim 5 wherein said means for correcting includes means for addressing data signals in said error memory and means for causing said printer to index said print element to the location of said erroneous data on a print page.

7. The apparatus of claim 6 wherein said means for correcting further includes means for erasing said erroneous data signals from said print page and means for removing said erroneous data from said error memory.

8. The apparatus of claim 1 wherein said means for indicating is a display driven by a buffer in which said erroneous data signals are stored.

9. The apparatus of claim 8 wherein said means for correcting includes means for addressing data signals in said buffer and on said display and means for changing the data signal displayed and the data signals stored in said buffer to correct data signals.

10. The apparatus of claim 9 wherein said means for addressing includes a cursor for locating signals on said display and said means for changing includes a keyboard operatively connected to said buffer and said display.

11. Apparatus for detecting and correcting erroneous data signals in a number of data signals comprising:
means for generating a number of sequences of data signals;
means for temporarily storing a sequence of data signals;
means for comparing said sequence of data signals with a list of valid sequences of data signals;
means responsive to said comparing means for indicating an erroneous sequence of data signals when said data signals do not compare to said valid sequence of data signals;
means for storing erroneous sequences of data signals and their relative positions in said number of sequences of data;
means for indicating the end of said sequences of data; and
means for correcting said erroneous sequences of data operative such that the correction of one occurrence of an erroneous sequence of data will automatically correct all occurrences of the same erroneous sequence of data.

12. A method for detecting and correcting erroneous data signals in a number of data signals comprising the steps of:
(a) receiving a stream of data signals;
(b) comparing said stream of data signals with a list of valid data signals;
(c) indicating erroneous data signals in said stream when said stream of data signals do not compare to said valid data signals; and
(d) correcting the first occurrence of said erroneous data signals such that subsequent occurrences of said erroneous data signals will be automatically corrected.

13. A method for detecting and correcting erroneous data signals in a number of data signals comprising the steps:
(a) generating a number of sequences of data signals;
(b) temporarily storing a sequence of data signals;
(c) comparing said sequence of said signals with a list of valid sequences of data signals;
(d) indicating an erroneous sequence of data signals when said data signals do not compare to said valid sequence of data signals;
(e) storing erroneous sequences of data signals and their relative positions in said number of sequence of data;
(f) indicating the end of said sequences of data; and
(g) correcting said erroneous sequences of data such that the correction of one occurrence of an erroneous sequence of data automatically corrects all occurrences of the same erroneous sequence of data.

* * * * *